US009978014B2

(12) United States Patent
Lupon et al.

(10) Patent No.: US 9,978,014 B2
(45) Date of Patent: May 22, 2018

(54) RECONFIGURABLE PROCESSING UNIT

(71) Applicant: Intel Corporation, Santa Clara, CA (US)

(72) Inventors: Marc Lupon, Barcelona (ES); Enric Herrero Abellanas, Cardedeu (ES); Ayose Falcon, L'Hospitalet de Llobregat (ES); Fernando Latorre, Barcelona (ES); Pedro Lopez, Molins de Rei (ES); Frederico Pratas, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 14/133,192

(22) Filed: Dec. 18, 2013

(65) Prior Publication Data

US 2015/0170021 A1 Jun. 18, 2015

(51) Int. Cl.
*G06F 17/00* (2006.01)
*G06N 3/063* (2006.01)

(52) U.S. Cl.
CPC .................. *G06N 3/063* (2013.01)

(58) Field of Classification Search
CPC ........................................ G06N 3/049
USPC ...................................... 706/15, 45
See application file for complete search history.

(56) References Cited

U.S. PATENT DOCUMENTS

| 4,536,878 | A | * | 8/1985 | Rattlingourd | ......... | G06F 11/183 |
| | | | | | | 714/795 |
| 5,138,695 | A | * | 8/1992 | Means | ...................... | G06K 9/56 |
| | | | | | | 382/156 |
| 7,248,646 | B1 | * | 7/2007 | Efstathiou | ......... | H04L 25/03834 |
| | | | | | | 375/232 |
| 8,391,306 | B2 | * | 3/2013 | Ito | ...................... | G06K 9/00986 |
| | | | | | | 370/412 |
| 2011/0239032 | A1 | * | 9/2011 | Kato | ...................... | G06F 17/15 |
| | | | | | | 713/500 |

OTHER PUBLICATIONS

Duffner, Face Image Analysis With Convolutional Neural Networks, Dissertation, Universit"at Freiburg, 2007.*
Large-Scale FPGA-based Convolutional Networks, by Farabet, published 2011.*
A Survey of Partially Connected Neural Networks, by Elizondo, published 1997.*
A high-performance fully reconfigurable FPGA-based 2D convolution processor, by Perri, published 2005.*
VFloat: A Variable Precision Fixed- and Floating-Point Library for Reconfigurable Hardware, by Wang, published 2007.*
VHDL Modeling of Convolutional Interleaver-Deinterleaver for Efficient FPGA Inplementation, by Upadhyaya, published 2009.*

(Continued)

*Primary Examiner* — David R Vincent
(74) *Attorney, Agent, or Firm* — Lowenstein Sandler LLP

(57) ABSTRACT

A processing device includes a processor core and a number of calculation modules that each is configurable to perform any one of operations for a convolutional neuron network system. A first set of the calculation modules are configured to perform convolution operations, a second set of the calculation modules are reconfigured to perform averaging operations, and a third set of the calculation modules are reconfigured to perform dot product operations.

24 Claims, 19 Drawing Sheets

(56) References Cited

OTHER PUBLICATIONS

Wikipedia, FIFO page, retrieved Jan. 18, 2017, URL: https://en.wikipedia.org/wiki/FIFO_(computing_and_electronics).*
Wikipedia page for Multiplexor, published Dec. 9, 2013, URL: https://en.wikipedia.org/wiki/Multiplexer.*
Wikipedia page for Hardware Register, retrieved Jun. 10, 2017, URL: https://en.wikipedia.org/wiki/Hardware_register.*
B. Bosi, G. Bois, and Y. Savaria, "Reconfigurable Pipelined 2-D Convolvers for Fast Digital Signal Processing", Very Large Scale Integration (VLSI) Systems, IEEE Transactions on 7.3 (1999):299-308.
G. Hinton, L. Deng, D. Yu, G. Dahl, A. Mohamed, N. Jaitly, A. Senior, V. Vanhoucke, P. Nguyen, T. Sainath and B. Kingsbury, "Deep Neural Networks for Acoustic Modeling in Speech Recognition," IEEE Signal Processing Magazine, pp. 82-97, 2012.
J. Holt and J.N. Hwang, "Finite Precision Error Analysis of Neural Network Hardware Implementations," IEEE Transactions on Computers, vol. 42, No. 3, pp. 281-290, Mar. 1993.
H. Kaul, M. Anders, S. Mathew, S. Hsu, A. Agarwal, R. Krishnamurthy and S. Borkar, "A 300mV 494GOPS/W Reconfigurable Dual-Supply 4-Way SIMD Vector Processing Accelerator in 45nm CMOS," IEEE Journal of Solid-State Circuits, vol. 45, No. 1, Jan. 2010.
A. Krizhevsky, I. Sutskever and G. Hinton, "ImageNet Classification with Deep Convolutional Neural Networks," in NIPS 2012: Neural Information Processing Systems, 2012.
E. Quirnell, E. Swartzlander, C. Lemonds, "Floating-Point Fused Multiply-Add Architectures", Proceedings of the Symposium on Computer Arithmetic, 2008.
Olivier Temam, "A Defect-Tolerant Accelerator for Emerging High-Performance Applications", In Proceedings of the 39th Annual International Symposium on Computer Architecture, 2012.

* cited by examiner

RECONFIGURABLE PROCESSING UNIT

TECHNICAL FIELD

The embodiments of the disclosure relate generally to a processing device and, more specifically, relate to a modular, reconfigurable, and variable-precision processing unit for convolutional neuron networks (CNNs).

BACKGROUND

Convolutional Neuron Network (CNN) is a computational model, recently gaining popularity due to its power in solving human-computer interface problems such as image understanding. The core of the model is a multi-staged algorithm that takes, as input, a large range of inputs (e.g., image pixels) and applies a set of transformations to the inputs in accordance to predefined functions. The transformed data may be fed into a neuron network to detect patterns.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Although the convolutional neuron network is very powerful, it requires a lot of computation that is commonly performed by central computing unit (CPU), graphical computing unit (GPU), and/or dedicated circuitry. Since these hardware components are not specifically designed for CNN, they may not provide the most efficient ways to compute CNNs.

Embodiments of the present disclosure provide distinguishing architectures that may have the advantage of lower costs and power consumption, small footprints, and high performance over current technologies.

Figure 1:
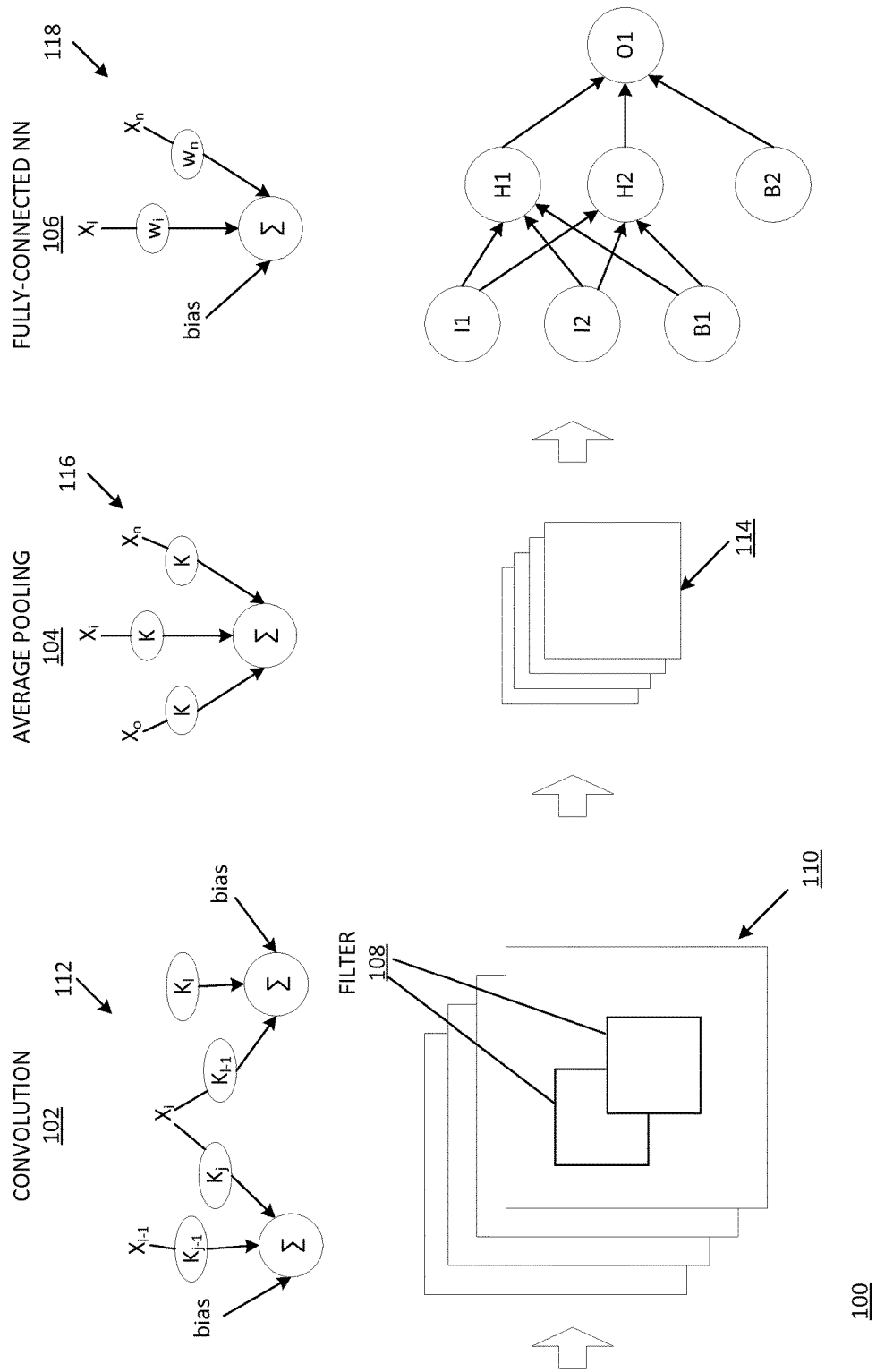
FIG. 1 illustrates a convolutional neuron network system.

Convolutional neuron network (CNN) systems commonly are composed of layers of three different types: convolution, pooling, and fully-connected neuron network. FIG. 1 illustrates a typical CNN system 100 that includes a convolution layer 102, an average pooling layer 104, and a fully-connected neuron network 106. Each layer as shown in FIG. 1 may perform a unique type of operation. For example, when the input is a sequence of images, the convolution layer may apply filter operations 108 to pixels of the image 110. Filter operations 108 may be implemented as convolution of a kernel over the entire image as illustratively shown in element 112, in which $x_{i-1}$, $x_i$ ... represent inputs (or pixel values), and $k_{j-1}$, $k_j$, $k_{j+1}$ represent parameters of the kernel. Results of the filter operations 108 may be summed together to provide an output from the convolution layer 102 to the next pooling layer 104. The pooling layer 104 may perform subsampling to reduce the images 110 to a stack of reduced images 114. Subsampling operations may be achieved through average operations or maximum value computation. Element 116 of FIG. 1 illustratively shows an average of inputs $x_o$, $x_i$, $x_n$. The output of the pooling layer 104 may be fed to the fully-connected neuron network 106 to perform pattern detections. The fully-connected neuron network 106 may apply a set of weights 118 in its inputs and accumulate a result as the output of the fully-connected neuron network layer 106.

In practice, convolution and pooling layers may be applied to input data multiple times prior to the results being transmitted to the fully-connected layer. Thereafter, the final output value is tested to determine whether a pattern has been recognized or not.

Each of the convolution, pooling, and fully-connected neuron network layers may be implemented with regular multiply-and-then-accumulate operations. Algorithms implemented on standard processors such as CPU or GPU may include integer (or fixed-point) multiplication and addition, or float-point fused multiply-add (FMA). These operations involve multiplication operations of inputs with parameters and then summation of the multiplication results. Although the multiplication and sum operations may be implemented in parallel on multi-core CPU or GPU, these implementations do not take into consideration unique requirements for different layers of CNN and thus may lead to higher bandwidth procurement, larger processing latency, and more power consumption than necessary.

The circuitry of CNN systems implemented on the general purpose hardware such as general purpose CPUs or GPUs is not designed to be reconfigured according to the precision requirements of different layers, where the precision requirements are measured according to the number of bits used for calculation. To support all of the operations of different layers, current CNN systems are implemented according to the highest precision requirement at single or double floating-point precision in the hardware units. This leads to the bandwidth, timing, and power inefficiencies.

Embodiments of the present disclosure may include modular calculation circuits that are reconfigurable according to the computational tasks. The reconfigurable aspects of the calculation circuits may include the precision of the computation and/or the manner of the computation. Specific embodiments of the present disclosure may include modular, reconfigurable, and variable-precision calculation circuits to perform different layers of CNN. Each of the calculation circuits may include same or similarly arranged components that may be optimally adapted to different requirements of different layers of CNN systems. Thus, embodiments of the disclosure may perform filter/convolution operations for the convolution layer, average operations for the pooling layer, and dot product operations for the fully-connected layer by reusing the same calculation circuits whose precisions may be adapted for the requirements of different types of computation. In this way, the bandwidth, time, and power resources are optimally utilized.

Figure 2A:
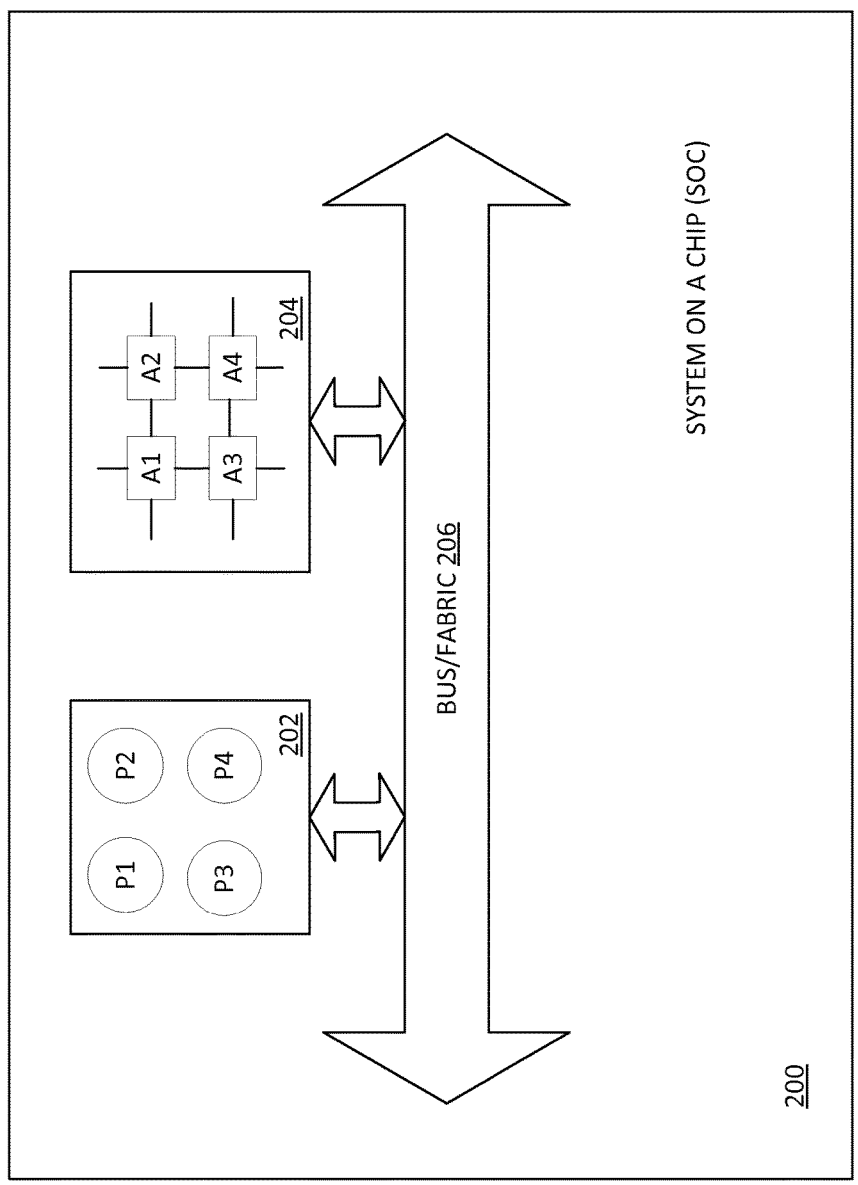
FIG. 2A illustrates a processing device according to an embodiment.

Embodiments of the present disclosure may include a processing unit implemented on a system-on-a-chip (SoC). FIG. 2A illustrates a processing device 200 according an embodiment. The processing unit may be a hardware processor such as a central processing unit (CPU), a graphic processing unit (GPU), or a general-purpose processing unit. As shown in FIG. 2A, the processing device 200 may include a processor block 202, a calculation accelerator 204, and a bus/fabric/interconnect system 206. The processor block 202 may further include one or more cores (e.g., P1-P4) to perform general purpose calculations and issue control signals through bus 206 to the calculation accelerator 204. Calculation accelerator 204 may further include a number of calculation circuits (e.g., A1-A4) each of which may be reconfigured to perform a specific type of calculations for a CNN system. In an embodiment, the reconfiguration may be achieved via control signals issued by the processor unit 202 and specific inputs provided to the calculation circuits. Cores within the processor unit 202 may issue, via bus 206, control signals to calculation accelerator 204 to control multiplexers therein so that a first set of the calculation circuits within calculation accelerator 204 are reconfigured to perform filter operations for convolution layers at first predetermined precisions, a second set of calculation circuits are reconfigured to perform average operations for pooling layers at second predetermined precisions, and a third set of calculation circuits are reconfigured to perform the neuron network computations at third precisions. In this way, processing device 200 may be fabricated on an SoC efficiently while the computation for CNN may be performed in a manner that optimizes resource usage.

Figure 2B:
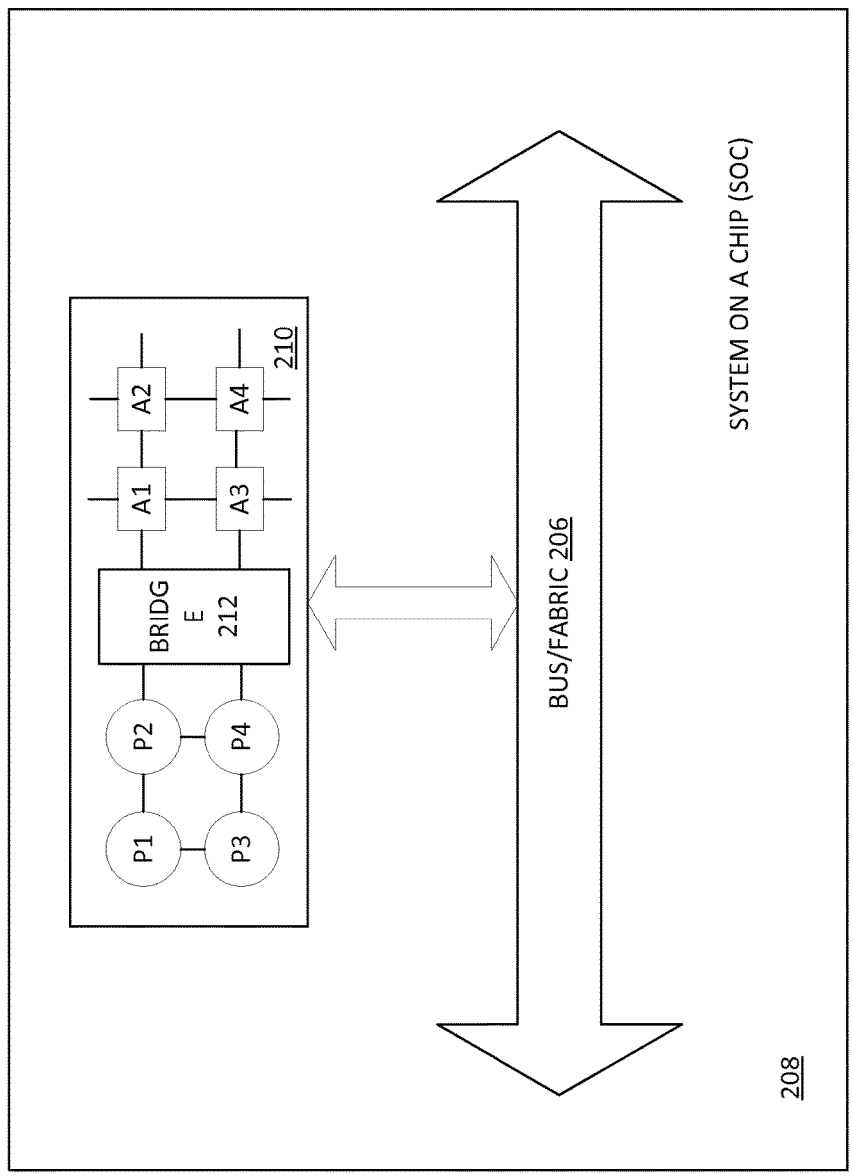
FIG. 2B illustrates a processing device according to another embodiment.

FIG. 2A illustrates an embodiment in which the accelerator 204 is a separate circuit block from the processor block 202. Alternatively, the accelerator may be fabricated as part of the processor block. FIG. 2B illustrates a processing device 208 that implements processor cores and calculation units on a processor block according to an embodiment. Processing device 208, as shown in FIG. 2B, may include a processor block 210 and a bus/fabric system 206 through which processor block 210 may other components one the SoC or peripheral devices that are off the SoC. Processing device 208 may be a CPU, a GPU, or a general-purpose processing unit. Processor block 210 may further include one or more cores (e.g., P1-P4), include a number of calculation circuits (e.g., A1-A4), and bridge 212 to connect the cores with the calculation circuits. Bridge 212 may include multiplexers (not shown) that selectively transmit control signals issued by cores P1-P4 to calculation circuits A1-A4 to adapt these calculation circuits for different layers of CNN operations. In an embodiment, a first set of the calculation circuits within processor block 210 are reconfigured to perform filter operations for convolution layers at first predetermined precisions, a second set of calculation circuits are reconfigured to perform average operations for pooling layers at second predetermined precisions, and a third set of calculation circuits are reconfigured to perform the neuron network computations at third precisions.

Figure 2C:
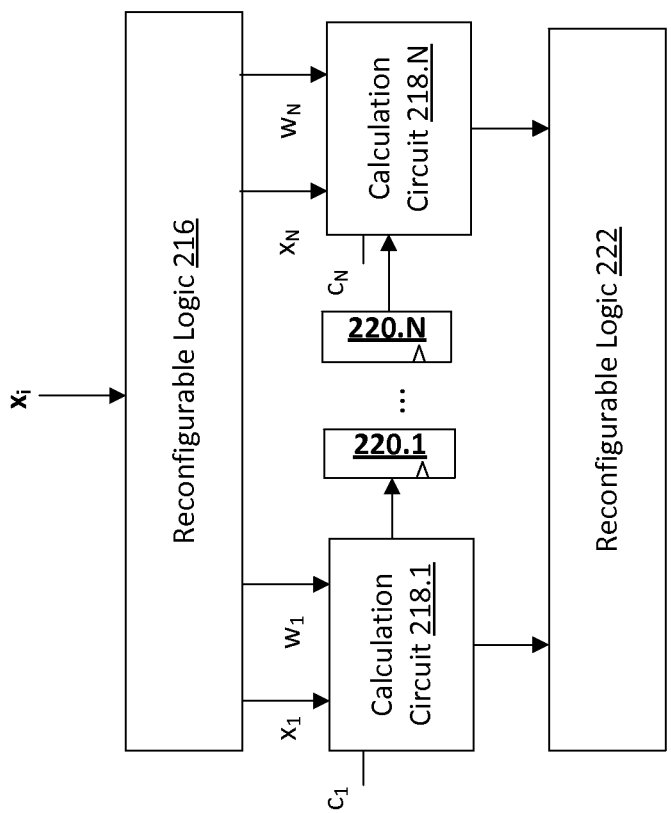
FIG. 2C illustrates a wide multiplier according to an embodiment.

To perform calculation for different layers of a CNN system, a wide multiplier may be constructed from a set of calculation circuits. FIG. 2C illustrates a wide multiplier 214 according an embodiment. Wide multiplier, as shown in FIG. 2C, may include a number of calculation circuits 218.1-218.N, reconfigurable logics 216, 222, and delay elements 220.1-220.N. Reconfigurable logic 216 may receive input signal $x_i$, $i=1, \ldots, N$, where the input signal may be image pixel values or sampled speech signals. Reconfigurable logic 216 may include multiplexers to transmit $x_i$ to inputs of different calculation circuits 218.1-218.N. Besides input signal $x_i$, reconfigurable logic 216 may also assign weight coefficients $w_i$, 1, . . . , N to different calculation circuits.

Calculation circuits 218.1-218.N may also receive control signals $C_i$, $i=1, \ldots, N$, which may be issued from processor cores. Control signals $C_i$ may control multiplexers within calculation circuits 218.1-218.N to reconfigure these calculation circuits to perform filter or average operations at desirable precisions.

A copy of the output of a calculation circuit may be passed to a next calculation circuit through a delay element which may include a latch to store the output for a predetermined period of time such as one clock cycle. For example, a copy of the output of calculation circuit 218.1 may be delayed by delay element 220.1 before it is fed to next calculation circuit 218.2 (not shown). Another copy of outputs from calculation circuits 218.1-218.N may be weighted sum of the input $x_i$, $i=1, \ldots, N$. When calculation circuits 218.1-218.N work collaboratively, they may achieve a convolution layer, or a pooling layer, or a fully-connected layer of a CNN system.

Figure 3A:
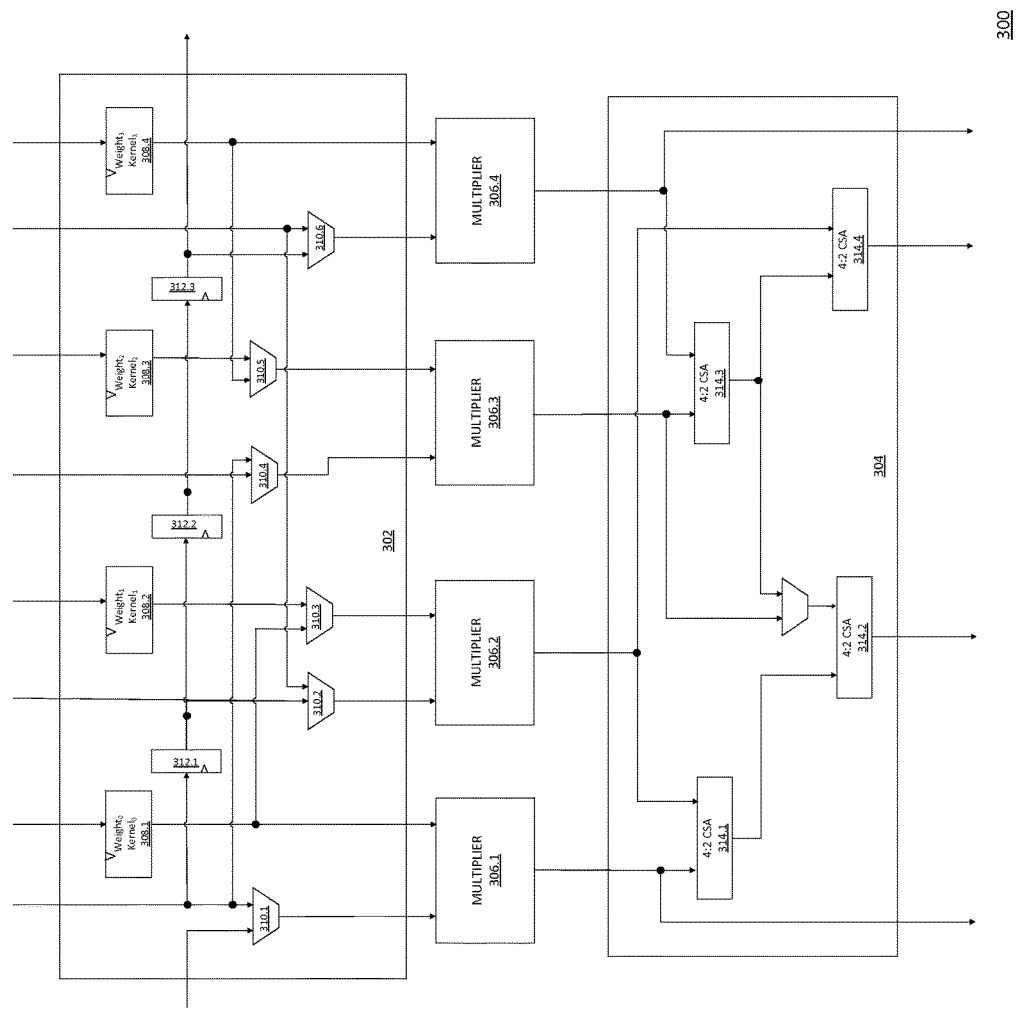
FIG. 3A illustrates a reconfigurable calculation circuit according to an embodiment.

Calculation circuits may be implemented using multipliers, multiplexers, delay elements, and adders. Each calculation circuit may handle one or more input values. In an embodiment, each calculation circuit may handle four input values in parallel to achieve modular and efficient computation. FIG. 3A illustrates a reconfigurable calculation circuit 300 according to an embodiment. The reconfigurable calculation circuit 300, as shown in FIG. 3A, may include a reconfigurable input distributor 302, a reconfigurable accumulator 304, and a number of multipliers 306.1-306.4. Reconfigurable input distributor 302 may include a number of registers 308.1-308.4 for storing weights and/or kernel coefficients and a number of multiplexers 310.1-310.6 which control when input signals and weight/kernel parameters are available to multipliers 306.1-306.4. Reconfigurable input distributor 302 may also include a number of delay elements 312.1-312.3 that are coupled to the inputs of the reconfigurable input distributor for delay input signal. In an embodiment, delay elements 312.1-312.4 may be a latch that may delay its input by one clock cycle.

Each of multipliers 306.1-306.4 may include a first input to receive a value of the input signal and a second input to receive a weight/kernel parameter. Multipliers 306.1-306.4 may be hardware components that perform multiplication operation of integer or fixed-point inputs. In an embodiment, the multipliers 306.1-306.4 may be 8-bit fixed-point multipliers. The reconfigurable accumulator 304 may include a network of adders for summing products from outputs of multipliers 306.1-306.4. In an embodiment, adders in reconfigurable accumulator 304 are carry-save adder (CAS) 314.1-314.4.

Figure 3B:
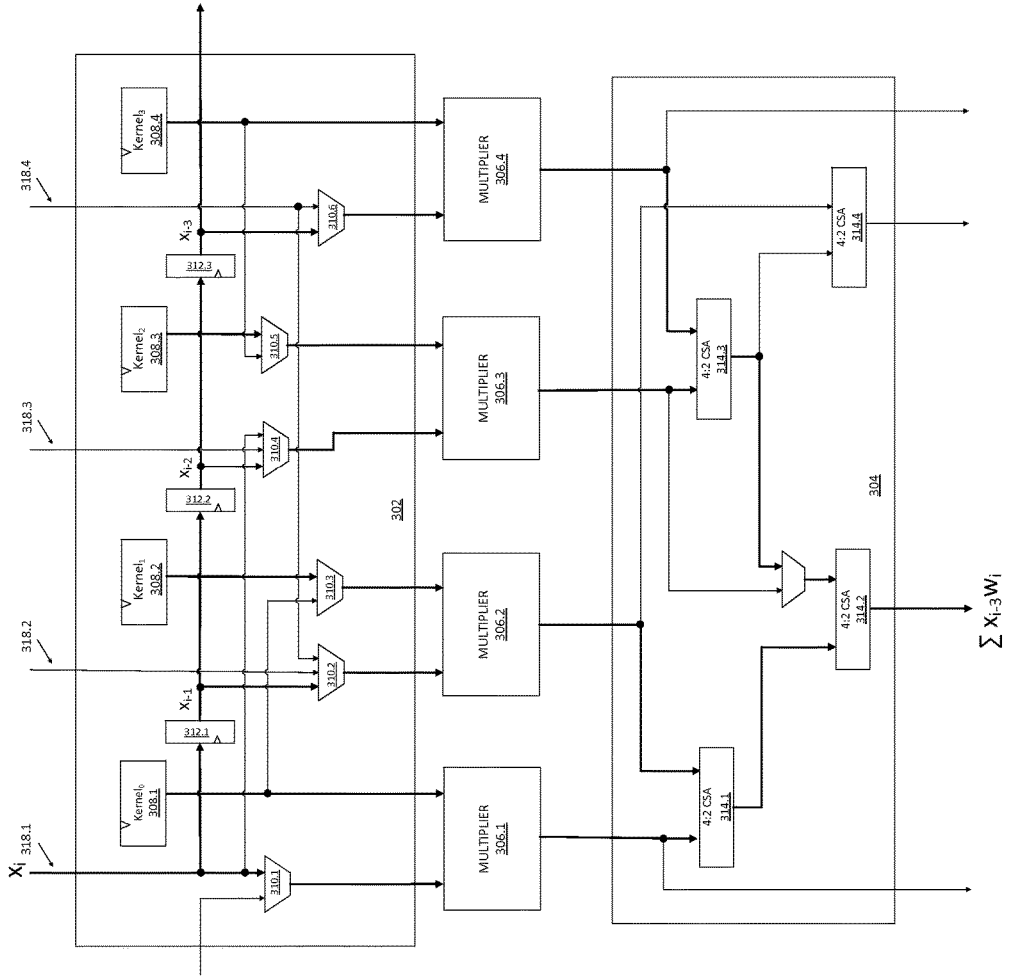
FIG. 3B illustrates a reconfigurable calculation circuit configured to perform convolution and/or average according to an embodiment.

Calculation circuit 300 as shown in FIG. 3A may be reconfigured, without changing the components and interconnections, to perform convolution, average, maximum value, or dot-product operations. FIG. 3B illustrates convolution (and/or average) calculation circuit 316 according to an embodiment. Convolution calculation circuit 316, as shown in FIG. 3B, may include the same components that are similarly arranged as those shown in FIG. 3A and may perform an 8-bit convolution of four values at a time. Each clock cycle, a new input of 8 bits may be supplied to the first multiplier 306.1 through the first input node 318.1. To achieve convolution operations of input values $x_i$ with a kernel [$k_j$, j=0, ..., 4], the kernel value $k_j$ may be stored locally at registers 308.1-308.4 for quick access. Also, input $x_i$ may be stored in delay elements 312.1-312.3 so that it may be delivered in subsequent clock cycles as $x_{i-1}$, $x_{i-2}$, and $x_{i-3}$ to multipliers 306.2-306.4. The selective inputs to the multipliers 306.1-306.4 may be achieved by control signals issued from the processor block that control multiplexers 310.1-310.6. Multipliers 306.1-306.4 may operate in parallel and send the outcomes to reconfigurable accumulator 304 which may sum the product outcomes to result in $\Sigma x_{(i-3)} k_j$ for j=1, ..., 4. As such, convolution may be achieved as long as a single 8-bit input data is supplied to the first input at each clock cycle, delivering one convolution of four consecutive input values per clock cycle. In an embodiment, the kernel may be chosen to be equal weight such as ¼, resulting the eventual outcome to be an average of $x_i$.

In an embodiment, outcomes from convolution calculation circuits may be pipeline into average calculation circuits without using temporary storages for intermediate outcomes. Similarly, outcomes from average calculation circuits may also be pipelined into average calculation circuits. In this way, multiple filtering (convolution) and pooling (average) layers may be built as a pipeline prior to application of a fully-connected neuron network.

Figure 3C:
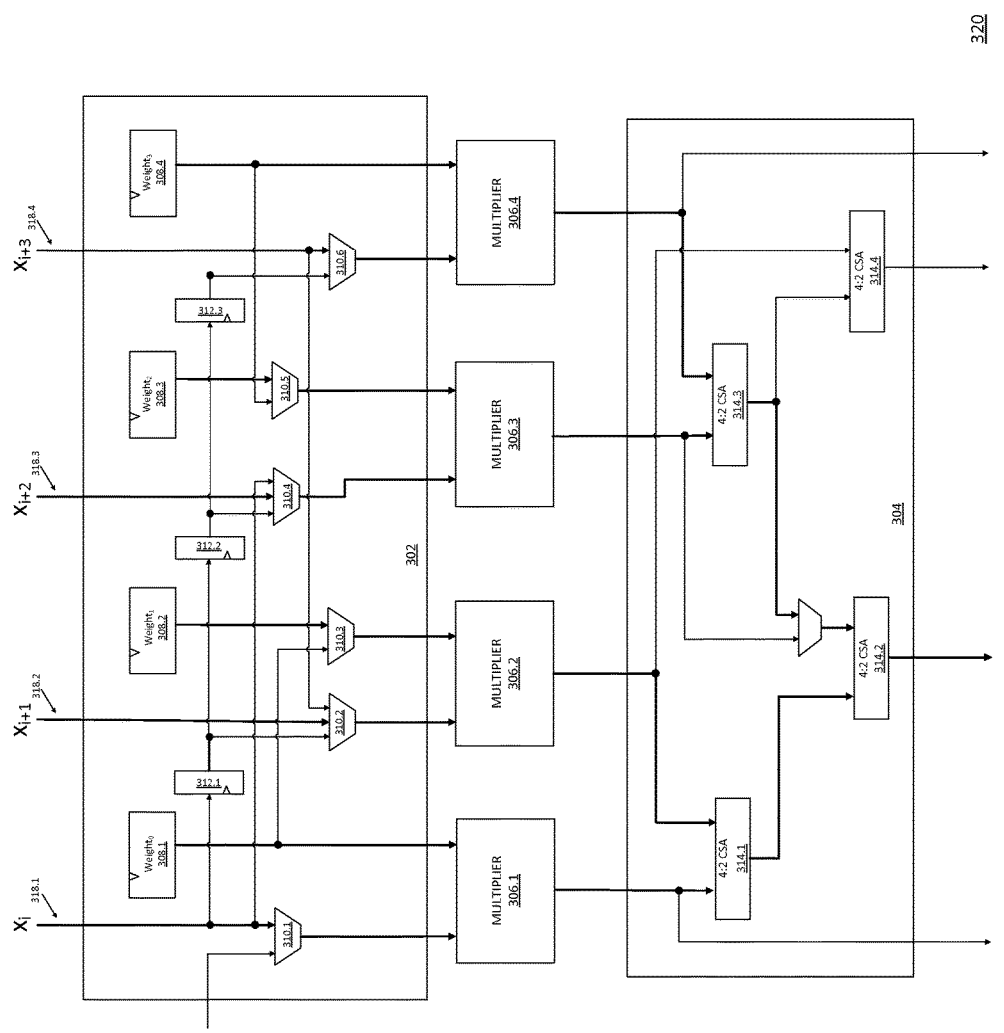
FIG. 3C illustrates a reconfigurable calculation circuit configured to perform dot product according to an embodiment.

Calculation circuit 300 as shown in FIG. 3A may be adapted, without changing components and interconnections therein, to perform dot product operations. Dot product operations may be used to compute the partial sum of four synapses or products of different inputs and weights, commonly used in the fully-connected neuron network layer. FIG. 3C illustrates dot product calculation circuit 320 according to an embodiment. Compared to FIG. 3B, instead of latching input $x_i$ through delay elements 312.1-312.3, input $x_i$ ... $x_{i+3}$ may be fed directly to multipliers 306.1-306.4, where the inputs may have been stored in a temporary storage such as a cache. The selective inputs to the multipliers 306.1-306.4 may be achieved by control signals issued from the processor block that control multiplexers 310.1-310.6. In an embodiment, registers 308.1-308.4 may store weights $w_i$, i=1, ..., 4, representing neuron synapses. In operation, four input values may be presented to dot product calculation circuit 320 at a time to generate a result of $\Sigma x_i w_i$, i=1, ..., 4.

Figure 3D:
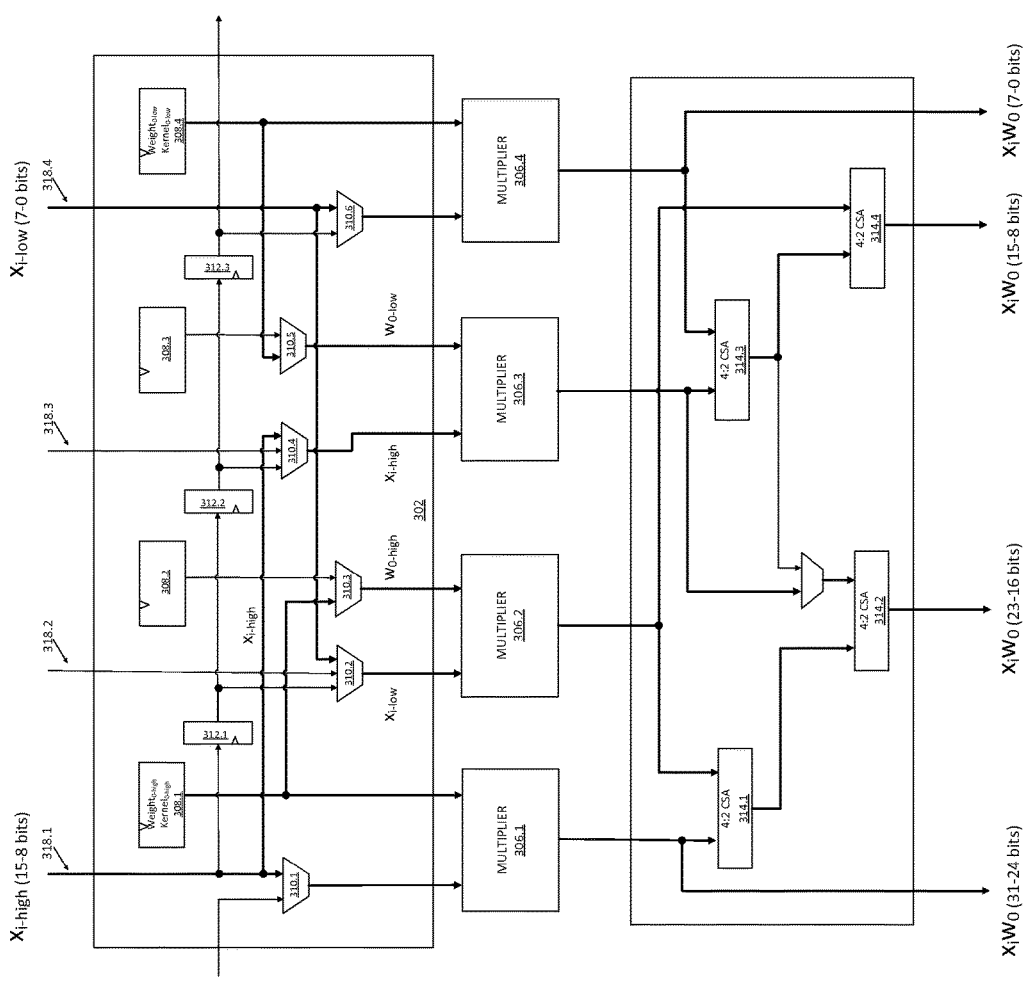
FIG. 3D illustrates a higher precision multiplier according to an embodiment.

Embodiments as described in FIGS. 3A-3C may be adapted to enable 16-bit operations, so that the results may be achieved at a higher precision. FIG. 3D illustrates a calculation circuit 322 that is adapted to perform 16-bit multiplications according to an embodiment. 16-bit multiplication module 322, as shown in FIG. 3D, may include same components that are similarly arranged as the calculation circuit 300 as shown in FIG. 3A. A single 16-bit input may be split into higher 8 bits that are supplied to multiplier 306.1 and lower 8 bits that are supplied to multiplier 306.4. Similarly, 16-bit weight is split so that the higher 8 bits are stored in register 308.1 and the lower 8 bits are stored in register 308.4. The higher 8 bits of input are also provided to multiplier 306.3, and the lower 8 bits are also provided to multiplier 306.2. The higher 8 bits of weight are also provided to multiplier 306.2, and the lower 8 bits are also provided to multiplier 306.3. Product outcomes from multipliers 306.1-306.4 may be fed into reconfigurable accumulator 304 whose outputs include bit ranges 31-24, 23-16, 15-8, 7-0.

Figure 3E:
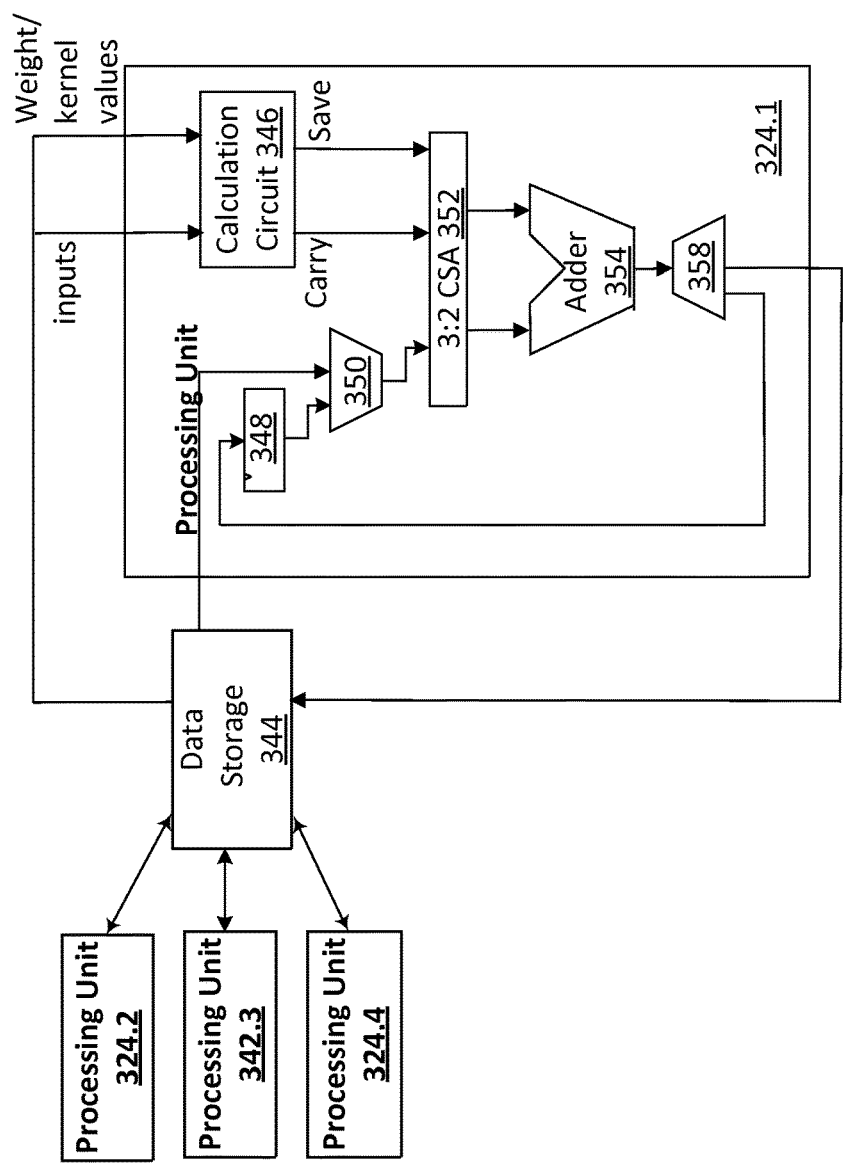
FIG. 3E illustrates a system combining reconfigurable calculation circuits according to an embodiment.

This result may be combined with a value from data storage to deliver convolution, average, or dot product operations for CNN systems at higher precisions. FIG. 3E illustrates a system 322 that may achieve high precision operations according to an embodiment. System 322, as shown in FIG. 3E, may include processing units 324.1-324.4 that may access data storage 344. Each processing unit (such as 324.1) may further include a calculation circuit 346 that is reconfigured according to the calculation circuit as shown in FIG. 3D to perform 16-bit multiplication using four 8-bit multipliers. Processing unit 324.1 may also include a latch 348, a multiplexer 350, a 3:2 carry-save adder (CSA) 352, an adder 354, and a splitter 358. Each processing unit may perform one 16-bit multiplication and store the outcomes in data storage 344 and then combined according to the following operations. At a first clock cycle, dependent upon which operation (convolution, average, or dot product) to perform, inputs and weights (and/or kernel values) may be supplied to calculation circuit 346. Outcomes from module 346 may include a product (save) and a carry bit that may be supplied to CSA 352. Results from other processing units 324.2-324.4 may be provided to CSA 352 through data storage 344. CSA 352 and adder 354 may be combined together to achieve the multiplication and addition operations for convolution, average, and dot product operations. The outcome of these operations may be stored in data storage 344 and temporarily stored in latch 348. In this way, multipliers of $2^{n-1}$ bit precision may be combined to form operations at $2^n$ bit precision.

Figure 3F:
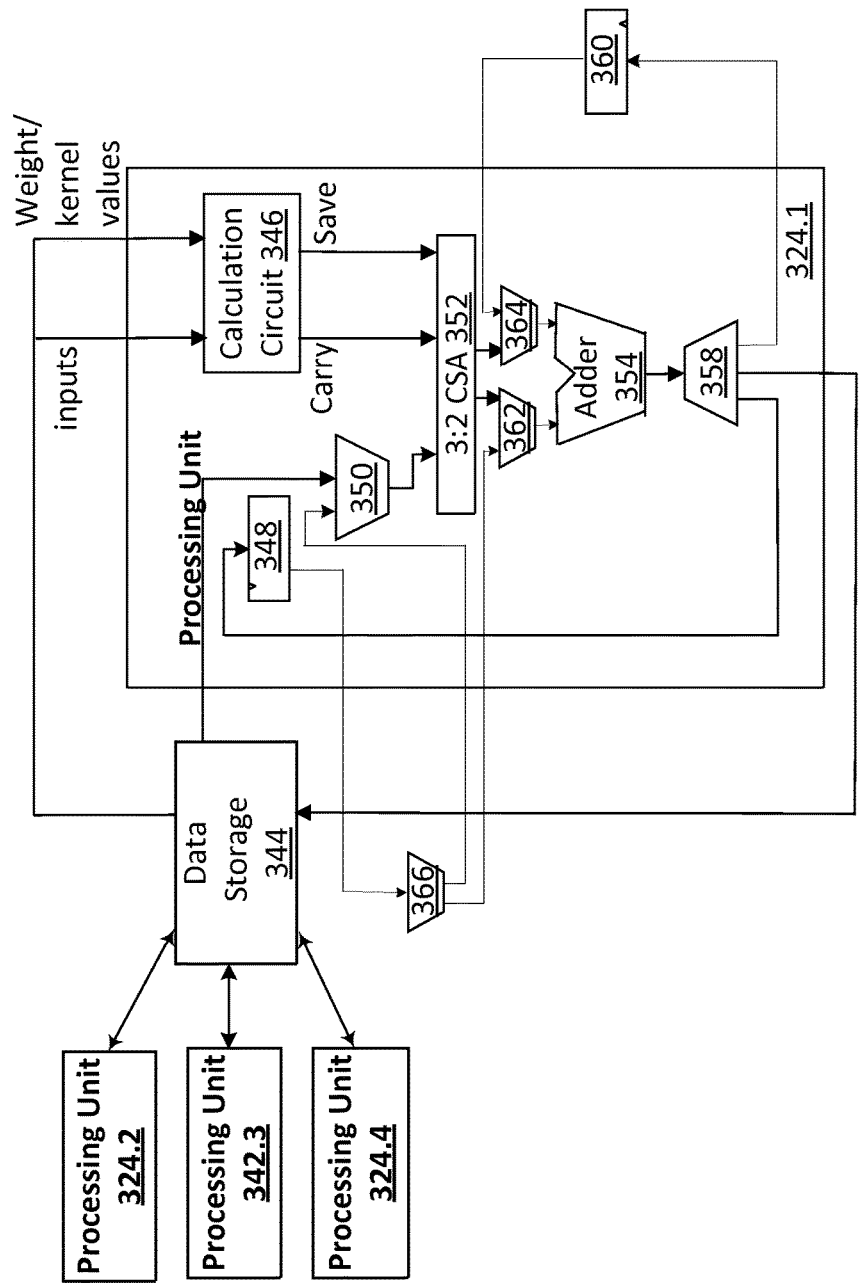
FIG. 3F illustrates a system configured to perform the maximum value operation according an embodiment.

FIG. 3F illustrates a system configured to perform the maximum value operation according to an embodiment. The output of a maximum value operator may be the maximum value within the window of the maximum value operator. In the context of images, the maximum value may be the maximum pixel intensity within the range of the operator. In an embodiment, the processing unit 324.1 as shown in FIG. 3E may be modified to include an extra storage 360 for storing intermediate results, multiplexers 362, 364, and a splitter 366. Thus, a first result from calculation circuit 346 may be converted to two's complement and selectively stored in storage 360 via multiplexer 364 and splitter 358, and a subsequent second result from calculation circuit 346 may be converted to two's complement and selectively stored in storage 348 via multiplexer 362 and splitter 358. In a following clock cycle, data stored in storage 348 may be inverted to negative (e.g., by flip the sign bit), and the negated data may be provided to adder 354 via splitter 366 and multiplexer 362, and the data stored in storage 360 may also be provided to adder 354 via multiplexer 364 to be added with the negated data from storage 348. If the result from the addition is negative, the data stored in storage 348 is larger than the one stored in storage 360 and is moved to storage 360. However, if the result is positive, the data stored in storage 360 is larger and remains in storage 360. These steps may be repeated for all values within the maximum value operator to determine the maximum value in the range of the operator.

Figure 4:
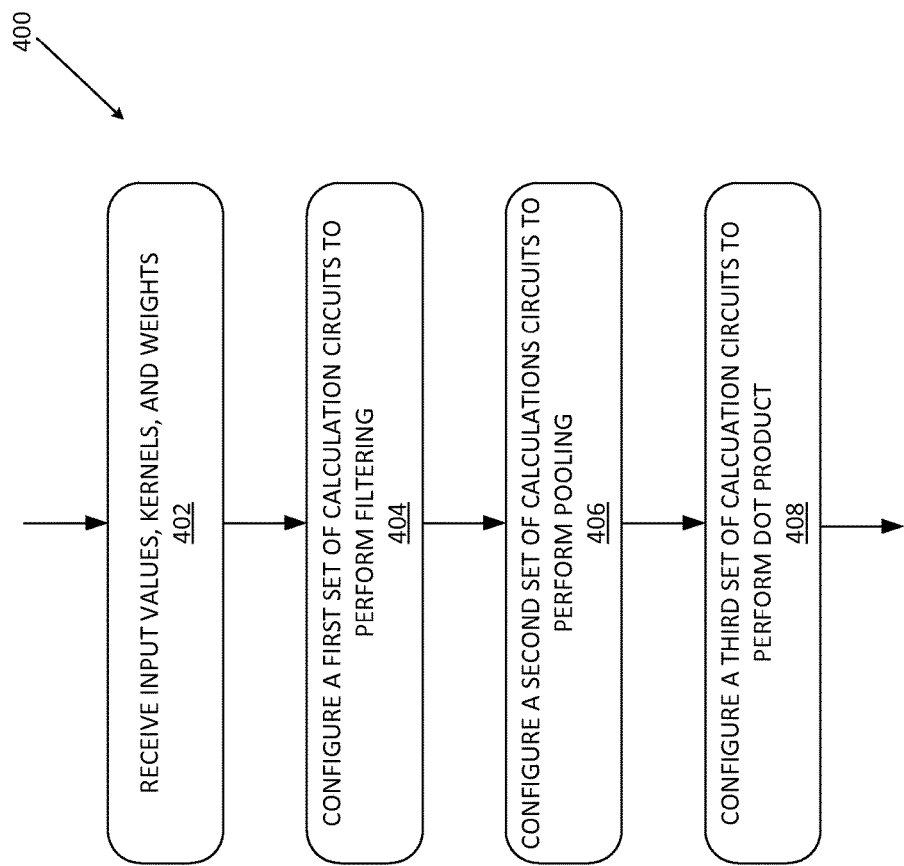
FIG. 4 is a flow diagram of a method of using reconfigurable calculation circuits to perform operations of convolutional neuron network (CNN) according to an embodiment.

FIG. 4 is a flow diagram illustrating a method 400 of performing operations of CNN, according to one embodiment of the disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logic of the processor block 202 or 210 described above with respect to FIGS. 2A and 2B.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, the processing logic may be coupled to an array of reconfigurable calculation circuits that may be configured by the processor to perform any one of convolution operations, averaging operations, or dot product operations. In response to a request to perform a convolutional neuron network, at 402, the processor may receive input values, kernel values, and weights. The input values may be the data, such as image or speech signals, from which certain patterns are detected. The kernel values may be the kernel parameters used for convolution operations. The weights may be weight parameters used for weighted average. In an embodiment, input values, kernel, and weights may be 8 bits, 16 bits, 32 bits, or any number of bits that may be suitably stored in data storage. At 404, the processor may determine a first number of reconfigurable calculation circuits that may be used for a filter layer of the CNN, and in view of the determination, configure a first set of calculation circuits to perform the filtering (or convolution) operations. For example, the first set of calculation circuits may convolve the input values with the kernel. At 406, the processor may determine a second number of reconfigurable calculation circuits that may be used for a pooling layer of the CNN, and in view of the determination, configure a second set of calculation circuits to perform the pooling (or average) operations. For example, the second set of calculation circuits may receive outcomes from the first set of calculation circuits and perform a weighted average of the received outcome. At 408, the processor may determine a third number of reconfigurable calculation circuits that may be used for the fully-connected neuron network layer, and in view of the determination, configure a third set of calculation circuits to perform the dot product operations. In an embodiment, the results from the fully-connected neuron network may be used to detect patterns in the input values.

In an embodiment, subsequent to the operations described in FIG. 4, the first, second, and third sets of the reconfigurable calculation circuits may be reconfigured to perform a different operations for the CNN. In one embodiment, a subset of the first set of reconfigurable calculation circuits may be reconfigured to perform average or dot product operations, a subset of the second set of reconfigurable calculation circuits may be reconfigured to perform convolution or dot product operations, and a subset of the third set of reconfigurable calculation circuits may be reconfigured to perform convolution or average operations.

In an embodiment, all of the reconfigurable calculation circuits may be configured to perform a first operation. Subsequently, all of the reconfigurable calculation circuits may be reconfigured to perform a second or third operation. This is helpful when there are not sufficient numbers of calculation circuits to perform all operations in all layers of a CNN.

In an embodiment, subsequent to the operations described in FIG. 4, the reconfigurable calculation circuits may be reconfigured to perform operations at different bit depths for the CNN. In one embodiment, the operations described in FIG. 4 may be executed on calculation circuits configured at a bit depth of 8 bit. Subsequently, some of the calculation circuits may be reconfigured to perform any of the operations of CNN at 16 bits.

As described in above embodiments, different configurations and reconfigurations of reconfigurable calculation circuits may be achieved without changing components and the interconnections in each calculation circuit. Therefore, the reconfigurable calculation circuits may be manufactured uniformly and in a modular manner to achieve efficient manufacture.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Figure 5:
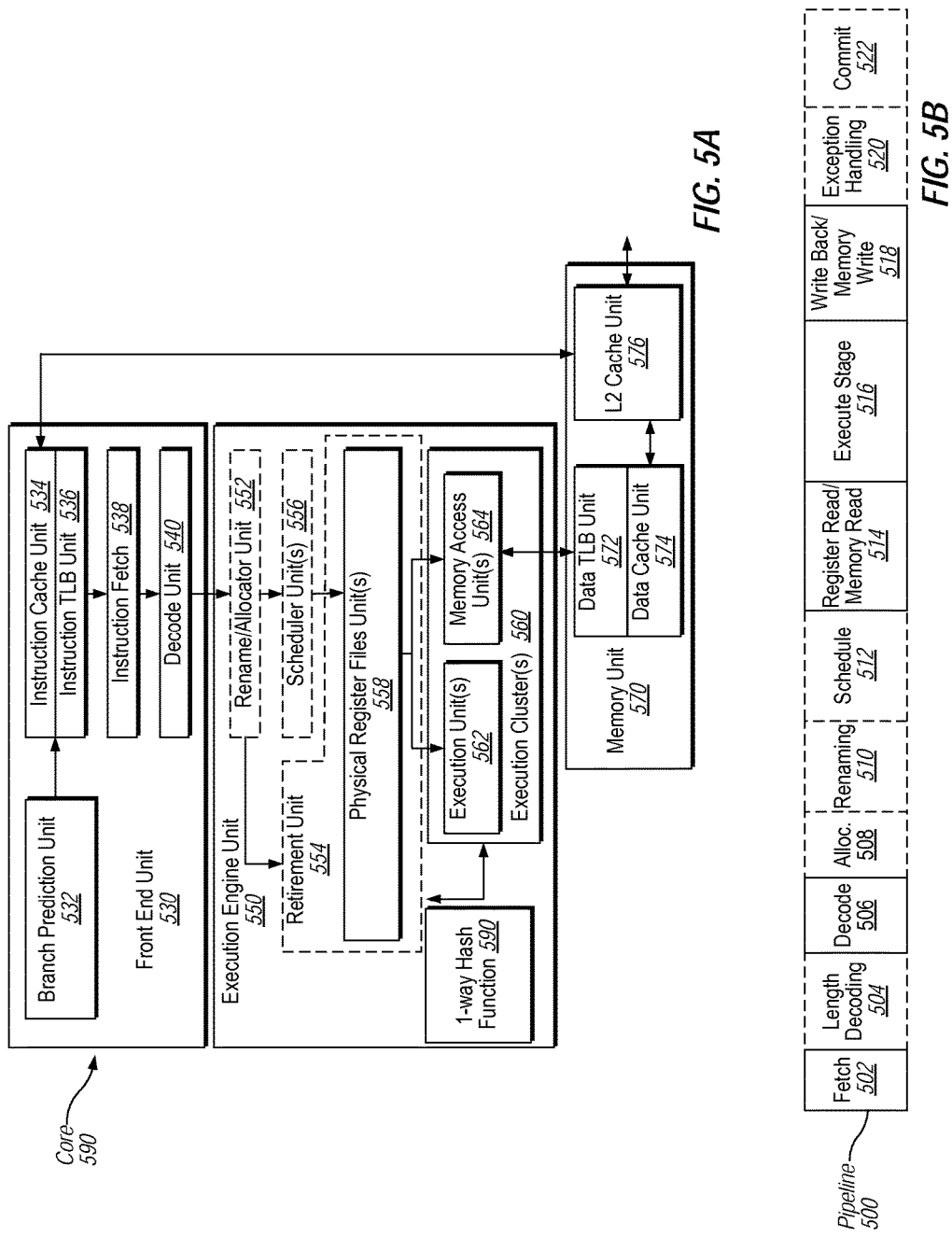
FIG. 5A is a block diagram illustrating a micro-architecture for a processor in which one embodiment of the disclosure may be used.
FIG. 5B is a block diagram illustrating an in-order pipeline and a register renaming stage, out-of-order issue/execution pipeline implemented according to at least one embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
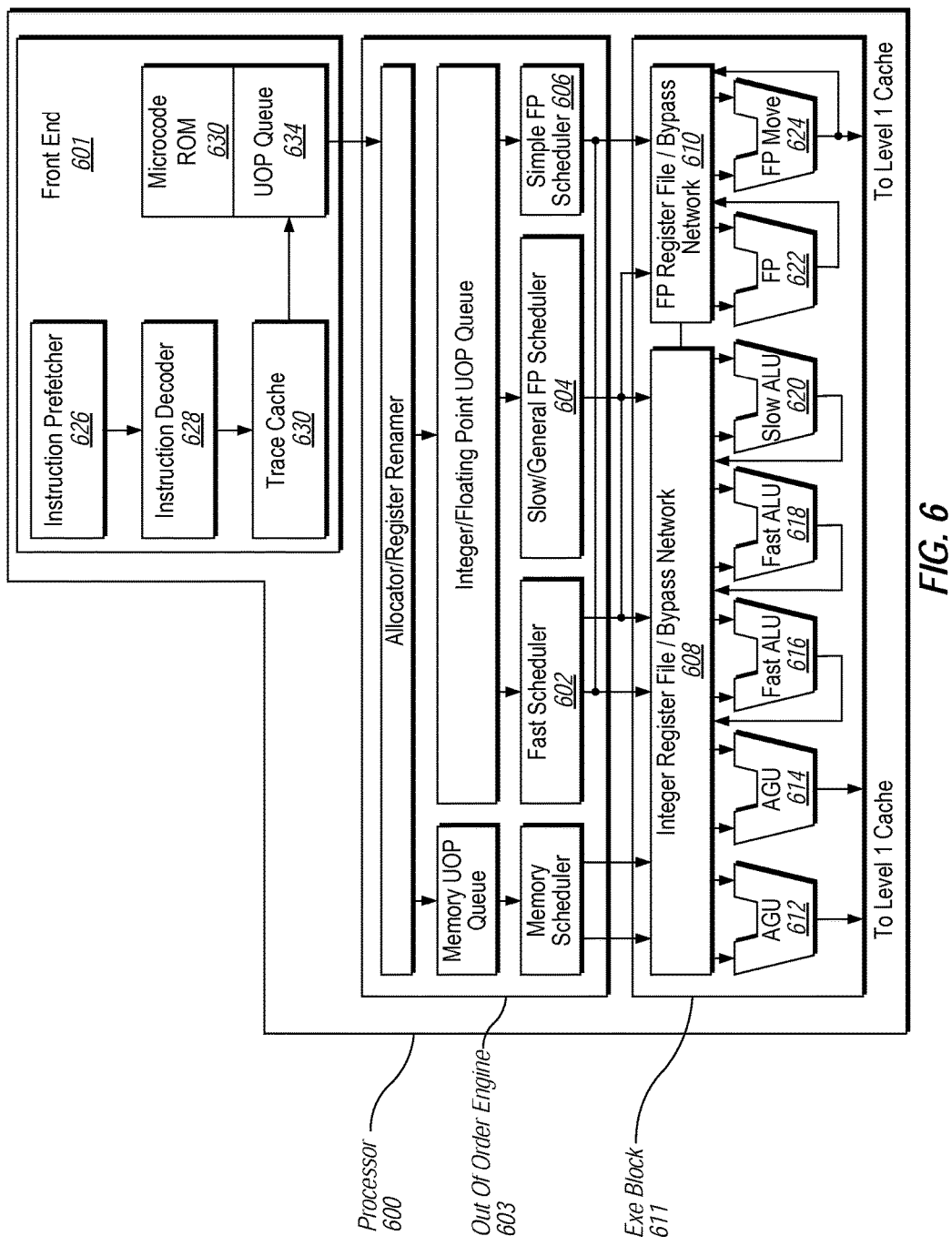
FIG. 6 illustrates a block diagram of the micro-architecture for a processor in accordance with one embodiment of the disclosure.

FIG. 6 illustrates a block diagram of the micro-architecture for a processor 600 in accordance with one embodiment of the disclosure. In some embodiments, an instruction in accordance with one embodiment can be implemented to operate on data elements having sizes of byte, word, double-word, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
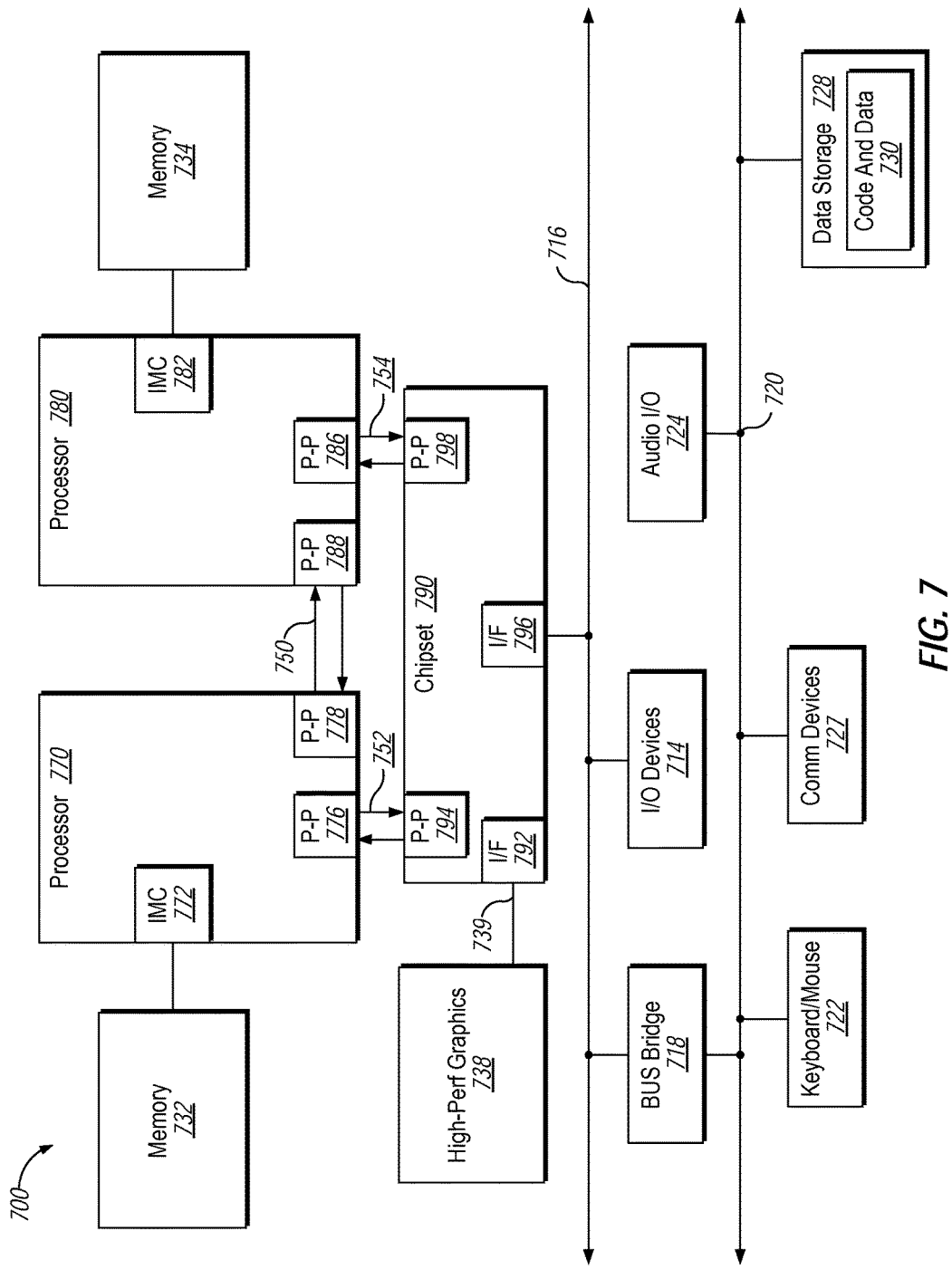
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that embodiments of the disclosure are not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
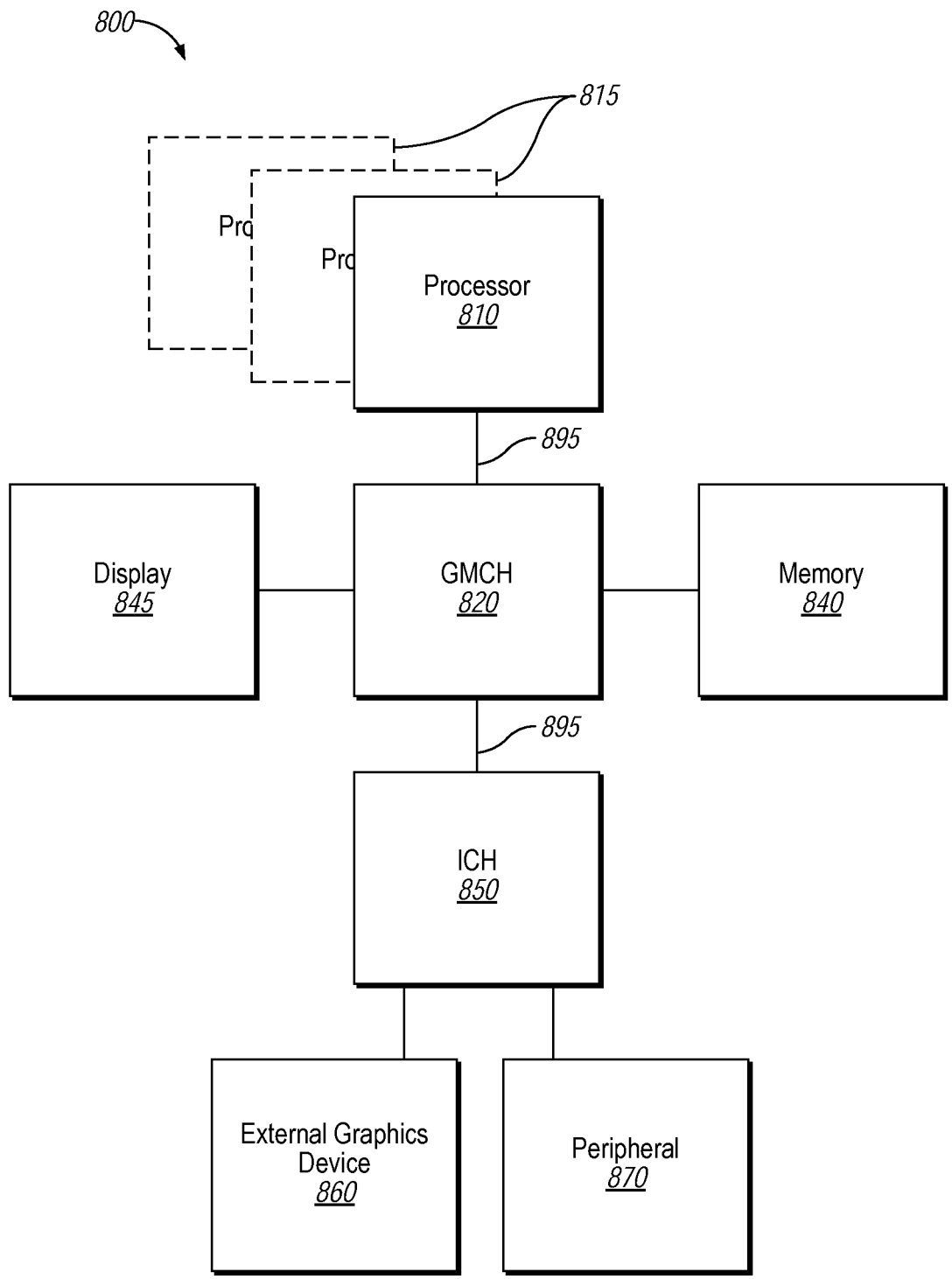
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800.

For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
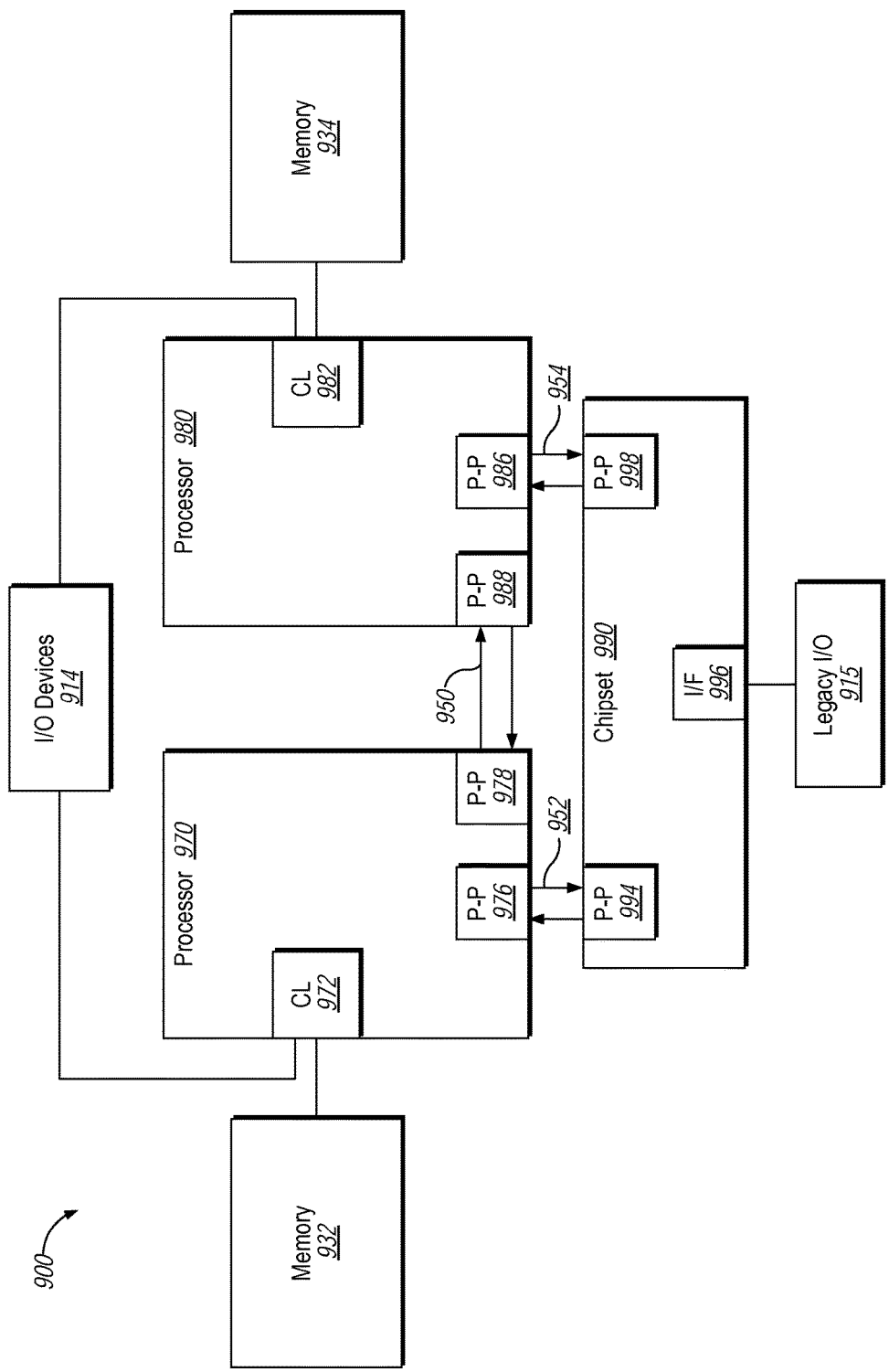
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
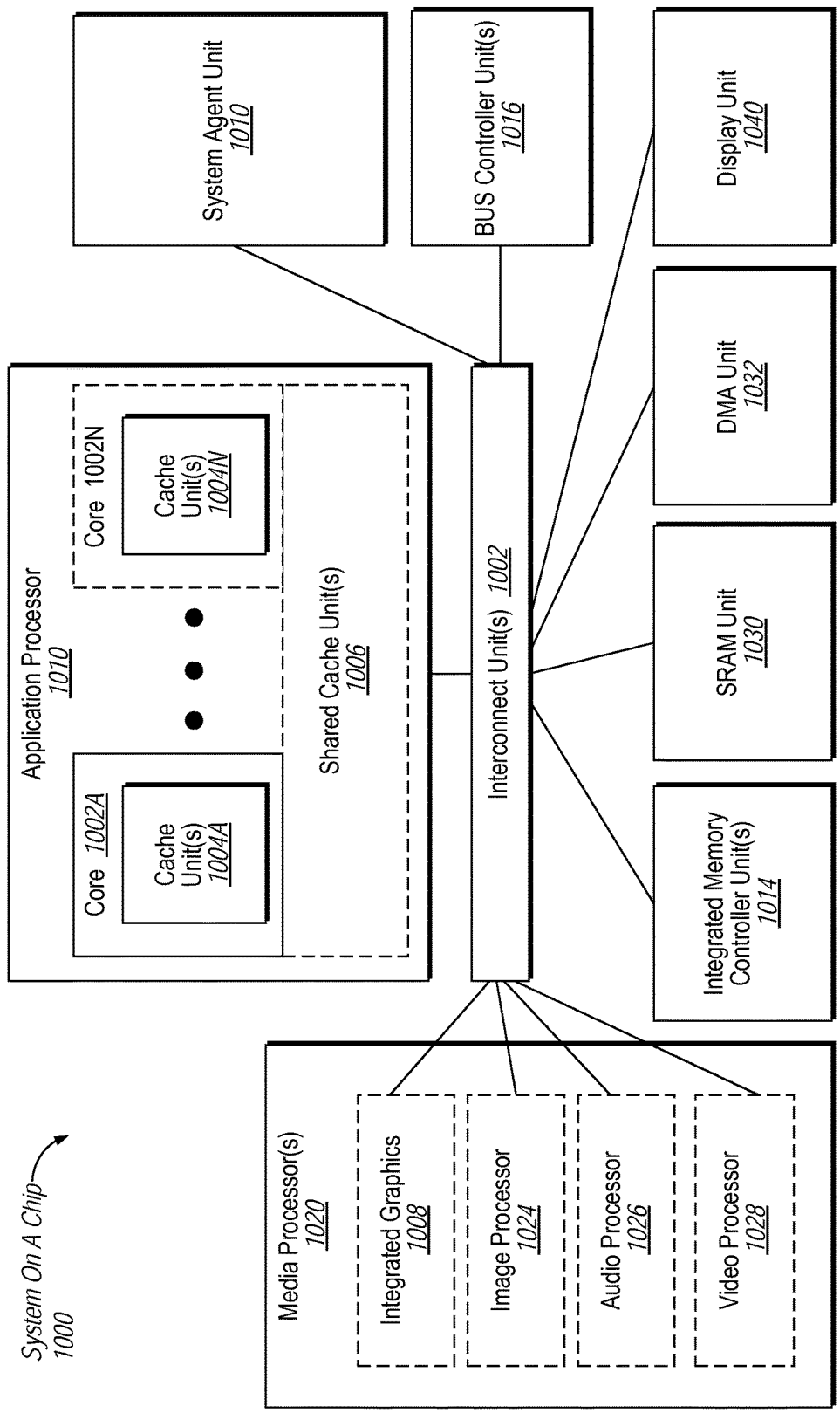
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
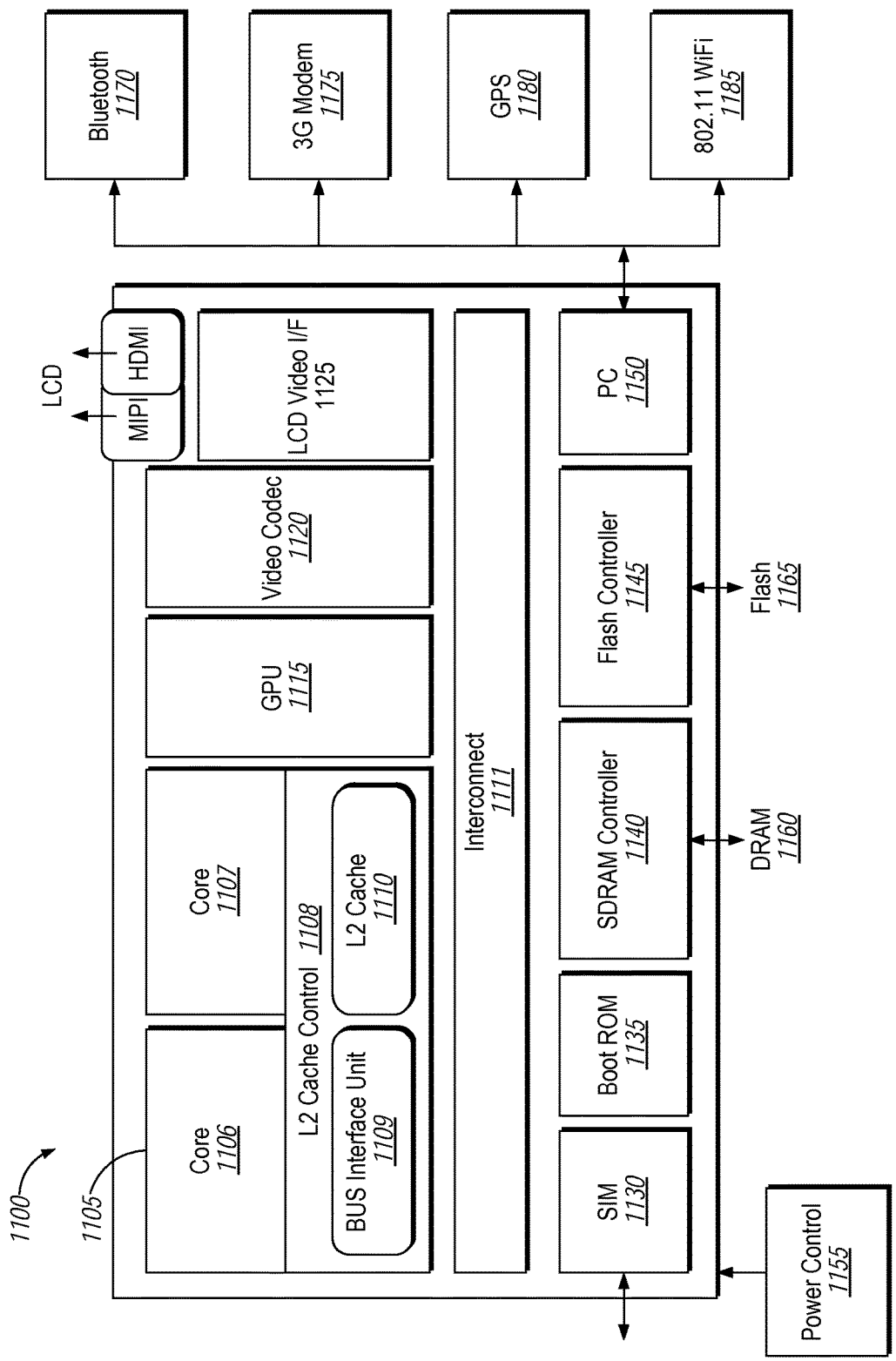
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
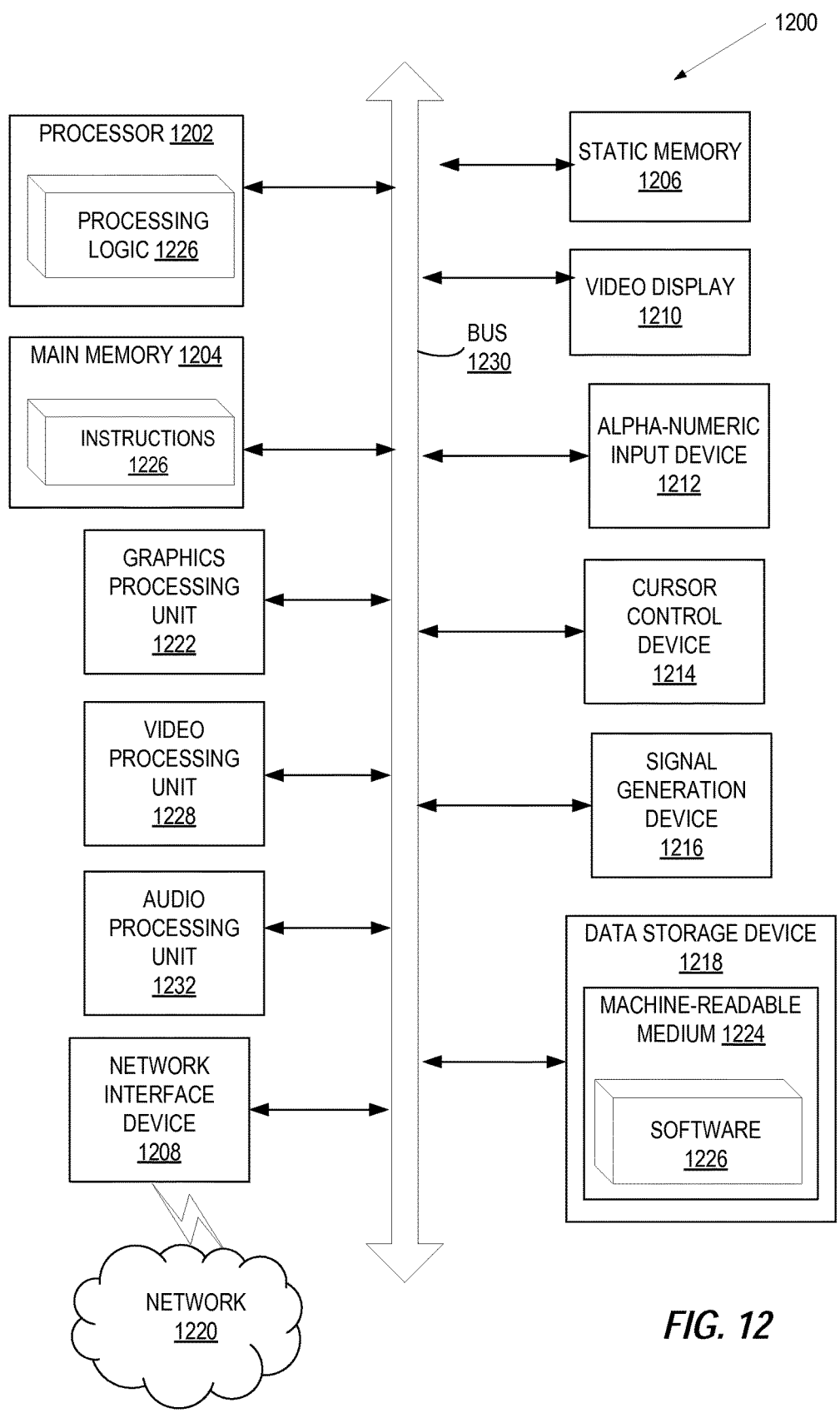
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device that each is configurable by the processor core to perform any one of operations of a convolutional neuron network (CNN) system.

In Example 2, the subject matter of Example 1 can optionally provide the operations of the CNN system include convolution operation, averaging operation, maximum value operation, and dot product operation.

In Example 3, the subject matter of Example 1 can optionally provide that the operations of the CNN system include convolution operation, averaging operation, and a maximum value operation.

In Example 4, the subject matter of any one of Examples 1-3 can optionally include an interconnect through which the processor core is coupled to the calculation circuits.

In Example 5, the subject matter of any one of Examples 1-4 can optionally provide that the processor core and the calculation circuits are part of a processor block.

In Example 6, the subject matter of any one of Examples 1-5 can optionally provide that a first set of the calculation circuits are configured to perform convolution operations, a second set of the calculation circuits are configured to perform averaging operations, and a third set of the calculation circuits are configured to perform dot product operations.

In Example 7, the subject matter of any one of Examples 1-6 can optionally provide that the calculation circuits are configured to perform a first operation, and subsequently, the calculation circuits are reconfigured to perform a second operation.

In Example 8, the subject matter of any one of Examples 1-7 can optionally provide that the calculation circuits are configured to perform 8-bit operations.

In Example 9, the subject matter of any one of Examples 1-7 can optionally provide that the calculation circuits are configured to perform operations at a higher precision than 8 bits.

In Example 10, the subject matter of any one of Examples 1-9 can optionally provide that the calculation circuits each comprises a reconfigurable distribution module, a set of multipliers, and a reconfigurable accumulation module.

In Example 11, the subject matter of Examples 1-10 can optionally provide that the calculation circuits each comprises four multipliers.

In Example 12, the subject matter of Example 10 can optionally provide that the reconfigurable distribution module is to distribute input signals, kernel parameters, and weight parameters to inputs of the set of multipliers, in which the set of multipliers are to generate respective products of the inputs of the set of multipliers, and wherein the reconfigurable accumulation module is to compute a sum of the respective products of the inputs of the set of multipliers.

In Example 13, the subject matter of any one of Examples 1-12 can optionally provide that the CNN system includes at least one convolution layer performing convolution operations, at least one pooling layer performing averaging operations, and a fully-connected neuron network performing dot product operations.

Example 14 is a method that may include receiving, by a processor, input values, configuring a first set of calculation circuits coupled to the processor to a first configuration to perform any one of operations of a first stage of a convolutional neuron network (CNN) system, configuring a second set of the calculation circuits coupled to the processor to a second configuration to perform any one of operations of a second stage of the CNN system, and transmitting the input values to the first and second sets of the calculation circuits to perform the operations of the first and second stages of the CNN system.

In Example 15, the subject matter of Example 14 may optionally provide that the operations of the CNN system comprise convolution operation, averaging operation, maximum value operation, and dot product operation.

In Example 16, the subject matter of Example 14 may optionally provide that the operations of the CNN system comprise convolution operation, averaging operation, and a maximum value operation.

In Example 17, the subject matter of any of Examples 14-16 may optionally include configuring a third set of calculation circuits coupled to the processor to a third configuration to perform any one of operations of a third stage of the CNN system, and transmitting the input values to the first, second and third sets of calculation circuits to perform operations of the first, second and third stages of the CNN system, in which the first stage comprises convolution operation, the second stage comprises averaging operation, and the third stage comprises dot product operation.

In Example 18, the subject matter of any of Examples 14-17 may optionally include configuring the plurality of calculation circuits to perform a first operation, and reconfiguring the plurality of calculation circuits to perform a second operation.

In Example 19, the subject matter of any of Examples 14-18 may optionally provide that the calculation circuits are configured to perform operations at higher precision than 8 bits.

In Example 20, the subject matter of any of Examples 14-18 may optionally provide that the calculation circuits are configured to perform operations at higher precision than 8 bits.

In Example 21, the subject matter of any of Examples 14-20 may optionally provide that the calculation circuits each comprises a reconfigurable distribution module, a set of multipliers, and a reconfigurable accumulation module.

Example 22 is a system on a chip (SoC) that includes a plurality of reconfigurable processing unit each of which is configurable by a processor to perform any one of operations of a convolutional neuron network (CNN) system at any one of precisions.

In Example 23, the subject matter of Example 22 may optionally provide that the operations of the CNN system comprise convolution operation, averaging operation, maximum value operation, and dot product operation.

In Example 23, the subject matter of Example 22 may optionally provide that the operations of the CNN system comprise convolution operation, averaging operation, and dot product operation.

In Example 24, the subject matter of Examples 22-23 may optionally include an interconnect coupled between the plurality of reconfigurable processing units and the processor.

Example 25 is a processing device that may include a processor core and means configurable by the processor core for performing any one of operations of a convolutional neuron network (CNN) system.

In Example 26, the subject matter of Example 25 may optionally provide that the CNN operations include convolution operation, averaging operation, maximum value operation, and dot product operation.

Example 27 is a machine-readable non-transitory medium having stored thereon program codes that, when executed, perform a method including receiving input values, configuring a first set of calculation circuits coupled to the processor to a first configuration to perform any one of operations of a first stage of a convolutional neuron network (CNN) system, configuring a second set of the calculation circuits coupled to the processor to a second configuration to perform any one of operations of a second stage of the CNN system, and transmitting the input values to the first and second sets of the calculation circuits to perform the operations of the first and second stages of the CNN system.

In Example 28, the subject matter of Example 27 may optionally provide that the CNN operations include convolution operation, averaging operation, maximum value, and dot product operation.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   a processor core receiving a plurality of input values representing a media content; and
   a plurality of calculation circuits, operatively coupled to the processor core, wherein each one of the plurality of calculation circuits is configurable by the processor core to perform any one of a plurality of operations associated with a convolutional neuron network (CNN) system, the each one of the plurality of calculation circuits comprising a reconfigurable input distributor, the reconfigurable input distributor comprising:
      a plurality of multiplexers to selectively receive an input signal, and
      a first delay element to delay, by a first number of clock cycles, reception of the input signal by a first one of the plurality of multiplexers and a second delay element to delay, by a second number of clock cycles, reception of the input signal by a second one of the plurality of multiplexers, and
   wherein at least one of the plurality of calculation circuits is configurable to switch from a first circuit configuration associated with a first operation of the plurality of operations to a second circuit configuration associated with a second operation of the plurality of operations, and wherein a subset of the plurality of the plurality of calculation circuit is to constitute a multiple-and-accumulate circuit; and
   wherein the processor:
      transmits a first set of the plurality of input values to a first set of the plurality of calculation circuits to perform the first operation;
      transmits a second set of the plurality of input values to a second set of the plurality of calculation circuits to perform the second operation;
      receives, from the plurality of calculation circuits, results generated by performing the first operation and the second operation; and
      provides presentation of the results on a display device.

2. The processing device of claim 1, wherein the plurality of operations comprise a convolution operation, an averaging operation, a maximum value operation, and a dot product operation.

3. The processing device of claim 1, wherein the plurality of operations of the CNN system comprise a convolution operation, an averaging operation, and a maximum value operation.

4. The processing device of claim 1, further comprising an interconnect through which the processor core is coupled to the plurality of calculation circuits.

5. The processing device of claim 1, wherein the processor core and the plurality of calculation circuits are part of a processor block.

6. The processing device of claim 1, wherein a first set of the plurality of calculation circuits is to perform convolution operations, a second set of the plurality of calculation circuits is to perform averaging operations, and a third set of the plurality of calculation circuits is to perform dot product operations.

7. The processing device of claim 1, wherein the plurality of calculation circuits are to perform the first operation at a first precision, and subsequently, the plurality of calculation circuits are to perform the second operation at a second precision.

8. The processing device of claim 1, wherein the first operation is performed at a precision of 8 bits.

9. The processing device of claim 1, wherein the second operation is performed at a higher precision than 8 bits.

10. The processing device of claim 1, wherein the plurality of calculation circuits each further comprises a set of multipliers, and a reconfigurable accumulation module.

11. The processing device of claim 10, wherein the plurality of calculation circuits each comprises four multipliers.

12. The processing device of claim 10, wherein the reconfigurable input distributor is to distribute the input signal, kernel parameters, and weight parameters to inputs of the set of multipliers, wherein the set of multipliers are to generate respective products of the inputs of the set of multipliers, and wherein the reconfigurable accumulation module is to compute a sum of the respective products of the inputs of the set of multipliers.

13. The processing device of claim 1, wherein the CNN system comprises at least one convolution layer performing convolution operations, at least one pooling layer performing averaging operations, and a fully-connected neuron network performing dot product operations.

14. A method comprising:
receiving, by a processor, a plurality of input values representing a media content;
configuring, by the processor, a first set of calculation circuits to a first circuit configuration to perform a first operation of a plurality of operations associated with a convolutional neuron network (CNN) system;
configuring, by the processor, a second set of the calculation circuits to a second circuit configuration to perform a second operation of the plurality of operations, wherein the each one of the first and second sets of calculation circuits comprising a reconfigurable input distributor, the reconfigurable input distributor comprising:
a plurality of multiplexers to selectively receive an input signal, and
a first delay element to delay, by a first number of clock cycles, reception of the input signal by a first one of the plurality of multiplexers and a second delay element to delay, by a second number of clock cycles, reception of the input signal by a second one of the plurality of multiplexers;
transmitting a first set of the plurality of input values to the first set of the calculation circuits to perform the first operation, and transmitting a second set of the plurality of input values to the second set of the calculation circuits to perform the second operation;
receiving, from the first set of the plurality of calculation circuits and the second set of the plurality of calculation circuits, results generated by performing the first operation and the second operation; and
providing presentation of the results on a display device.

15. The method of claim 14, wherein the plurality of operations comprise a convolution operation, an averaging operation, a maximum value operation, and a dot product operation.

16. The method of claim 14, wherein the plurality of operations comprise a convolution operation, an averaging operation, and a maximum value operation.

17. The method of claim 15, further comprising:
configuring, by the processor, a third set of calculation circuits to a third circuit configuration to perform a third operation of the plurality of operations; and
transmitting the plurality of input values to the first, second and third sets of calculation circuits to perform the respective first, second, and third operations,
wherein the first operation comprises the convolution operation, the second operation comprises the averaging operation, and the third operation comprises the dot product operation.

18. The method of claim 14, further comprising:
responsive to performing the first operation by the first set of calculation circuits, performing the second operation by the second set of calculation circuits based on results derived from the first set of calculation circuits.

19. The method of claim 14, wherein the first operation is performed at a precision of 8 bits.

20. The method of claim 14, wherein the second operation is performed at higher precision than 8 bits.

21. The method of claim 14, wherein each one of the first set and second set of calculation circuits comprises a set of multipliers, and a reconfigurable accumulation module.

22. A system on a chip (SoC), comprising:
a plurality of reconfigurable processing units, wherein each processing unit of the plurality of reconfigurable processing units is configurable by a processor to perform any one of a plurality of operations associated with a convolutional neuron network (CNN) system, the each one of the plurality of reconfigurable processing units comprising a reconfigurable input distributor, the reconfigurable input distributor comprising:
a plurality of multiplexers to selectively receive an input signal, and
a first delay element to delay, by a first number of clock cycles, reception of the input signal by a first one of the plurality of multiplexers and a second delay element to delay, by a second number of clock cycles, reception of the input signal by a second one of the plurality of multiplexers, and
wherein at least one of the plurality of reconfigurable processing units is configurable to switch from a first circuit configuration associated with a first operation of the plurality of operations to a second circuit configuration associated with a second operation of the plurality of operations, and wherein:
a first set of the plurality of reconfigurable processing units to receive a first set of input values of a plurality of input values representing a media content,
a second set of the plurality of reconfigurable processing units receive a second set of input values of the plurality of input values, and
the plurality of reconfigurable processing units transmit results to the processor that provides presentation of the results on a display device.

23. The SoC of claim 22, wherein the plurality of operations comprise a convolution operation, an averaging operation, a maximum value operation, and a dot product operation.

24. The SoC of claim 22, further comprising an interconnect coupled between the plurality of reconfigurable processing units and the processor.

\* \* \* \* \*